US008251356B2

(12) United States Patent
Eschenburg

(10) Patent No.: US 8,251,356 B2

(45) Date of Patent: Aug. 28, 2012

(54) DOOR INSTALLATION

(76) Inventor: Jerry E. Eschenburg, East China, MI (US)

( * ) Notice: Subject to any disclaimer, the term of this patent is extended or adjusted under 35 U.S.C. 154(b) by 329 days.

(21) Appl. No.: 12/387,753

(22) Filed: May 7, 2009

(65) Prior Publication Data

US 2009/0283947 A1 Nov. 19, 2009

Related U.S. Application Data

(60) Provisional application No. 61/127,103, filed on May 9, 2008.

(51) Int. Cl.

| | |
|---|---|
| ***B23Q 3/00*** | (2006.01) |
| ***B23Q 7/00*** | (2006.01) |
| ***B25B 1/00*** | (2006.01) |
| ***B25B 5/14*** | (2006.01) |
| ***B25B 27/14*** | (2006.01) |
| ***B23P 21/00*** | (2006.01) |
| ***G01C 9/24*** | (2006.01) |
| ***G01B 3/12*** | (2006.01) |
| ***E04F 21/00*** | (2006.01) |
| ***E06B 3/00*** | (2006.01) |
| ***B27C 5/00*** | (2006.01) |
| ***B27C 9/00*** | (2006.01) |
| *B25B 11/00* | (2006.01) |

(52) U.S. Cl. ......... 269/10; 269/111; 269/112; 29/281.1; 29/559; 29/772; 33/382; 33/770; 33/194; 144/144.1; 144/2.1

(58) Field of Classification Search .................... 269/10, 269/111, 112, 905; 33/370, 382, 194, 526, 33/404; 29/281.5, 559, 281.1, 2 P, 281.4, 772

See application file for complete search history.

(56) References Cited

U.S. PATENT DOCUMENTS

| | | | | | |
|---|---|---|---|---|---|
| 773,176 | A | * | 10/1904 | Washington | 33/194 |
| 1,257,200 | A | * | 2/1918 | Durkee | 33/194 |
| 1,627,175 | A | * | 5/1927 | Hansen, Jr. | 33/194 |
| 1,778,496 | A | * | 10/1930 | Hobbs | 33/194 |
| 2,502,166 | A | * | 3/1950 | Mckay | 33/194 |
| 2,679,696 | A | * | 6/1954 | Reeder, Jr. | 33/194 |
| 2,748,493 | A | * | 6/1956 | Williams | 33/194 |
| 2,855,695 | A | * | 10/1958 | Buck | 33/370 |
| 2,867,911 | A | * | 1/1959 | Atkinson | 33/194 |
| 3,059,341 | A | * | 10/1962 | Becker | 33/197 |
| 3,675,297 | A | * | 7/1972 | Appleton | 29/281.4 |
| 3,859,002 | A | * | 1/1975 | Sauey | 408/16 |
| 4,910,876 | A | * | 3/1990 | Channell | 33/374 |
| 4,947,594 | A | * | 8/1990 | Theobald et al. | 52/126.4 |
| 5,375,334 | A | * | 12/1994 | Coker | 33/194 |
| 5,396,707 | A | * | 3/1995 | Blase | 33/194 |
| 5,437,130 | A | * | 8/1995 | Raynak | 52/210 |
| 5,560,112 | A | * | 10/1996 | Stein et al. | 33/194 |
| 5,628,119 | A | * | 5/1997 | Bingham et al. | 33/613 |
| 5,775,036 | A | * | 7/1998 | Stanley, Sr. | 52/127.2 |
| D446,181 | S | | 8/2001 | Darbishire | |
| 6,282,852 | B1 | * | 9/2001 | Walcker | 52/212 |
| 6,328,364 | B1 | | 12/2001 | Darbishire | |

(Continued)

*Primary Examiner* — Lee D Wilson

*Assistant Examiner* — Alvin Grant

(74) *Attorney, Agent, or Firm* — Christopher John Rudy

(57) ABSTRACT

Tool having a body and at least one jamb-securing finger can be used to install a pre-hung door. The body can be removably attached to a building component about a door opening such as a 2×4, with the finger(s) for holding a jamb component of the pre-hung door. The tool may be intrinsically adjustable. A kit may include the tool, a fastener and/or a spacer.

20 Claims, 3 Drawing Sheets

U.S. PATENT DOCUMENTS

| | | | | |
|---|---|---|---|---|
| 6,442,853 | B1 * | 9/2002 | Hale et al. | 33/194 |
| 6,553,683 | B1 * | 4/2003 | Klass et al. | 33/562 |
| D477,805 | S | 7/2003 | LaBelle et al. | |
| D478,858 | S | 8/2003 | LaBelle | |
| 6,615,500 | B2 * | 9/2003 | Hale et al. | 33/194 |
| 6,763,639 | B2 * | 7/2004 | Bennett et al. | 52/212 |
| 6,810,592 | B1 * | 11/2004 | Oldfield, Jr. | 33/194 |
| 6,866,316 | B1 | 3/2005 | Harder et al. | |
| 6,868,613 | B2 * | 3/2005 | Sumner | 33/194 |
| 6,966,119 | B1 * | 11/2005 | Dlugoleski | 33/194 |
| 6,981,301 | B2 * | 1/2006 | Medina et al. | 29/281.5 |
| 7,014,400 | B1 | 3/2006 | LaBelle et al. | |
| 7,025,398 | B1 | 4/2006 | Montagna et al. | |
| 2002/0170189 | A1 * | 11/2002 | Cheatham | 33/194 |

* cited by examiner

DOOR INSTALLATION

This claims the benefits under 35 USC 119(e) of provisional application No. 61/127,103 filed on May 9, 2008 A.D. Its entire specification with drawings is incorporated herein by reference.

FIELD AND PURVIEW OF THE INVENTION

This concerns a tool useful for installing a pre-hung door, and a kit with and method use of the same. The tool has a body and jamb-holding finger(s).

BACKGROUND TO THE INVENTION

The installation of pre-hung doors can be fraught with difficulties and frustrating, especially for a do-it-yourselfer. Often it is difficult to install the door straight and level.

It would be desirable to ameliorate if not solve the problem. It would be desirable to provide alternative(s) to the art.

A FULL DISCLOSURE OF THE INVENTION

In general, provided is a tool useful for installing a pre-hung door, which comprises a body and at least one jamb-securing finger. The body can be removably attached to a building component about a door opening such as a 2×4, with the finger(s) for holding a jamb component of the pre-hung door.

The invention is useful in building construction.

Significantly, by the invention, the art is advanced in kind. A simple and efficient tool is provided that may be employed with another such tool to hold fast the door jamb in relation to door frame components so that shimming, shoring and securing of the door jamb in a straight and level orientation can be readily accomplished, even by the do-it-yourselfer. The invention is cost effective to manufacture and transport, alone or in a kit.

Numerous further advantages attend the invention.

The drawings form part of the specification hereof. With respect to the drawings, which are not necessarily drawn to scale, the following is briefly noted:

Figure 1:
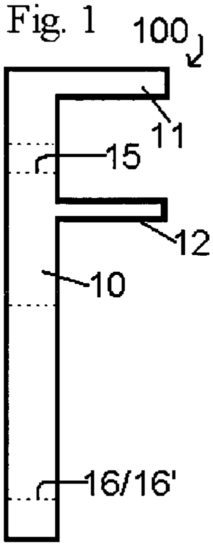
FIG. 1 is a plan view in elevation of a first side of a tool useful for installing a pre-hung door.
Figure 2:
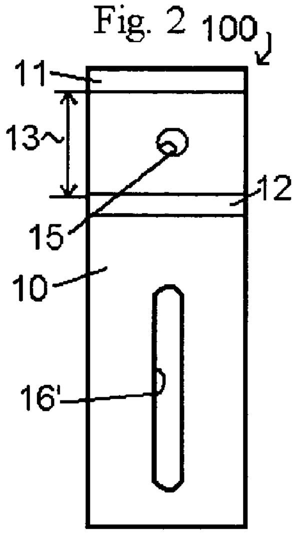
FIG. 2 is a view in elevation of a jamb-and-frame-facing side of the tool of FIG. 1.
Figure 3:
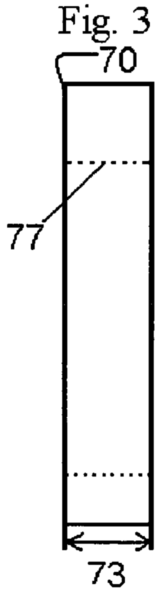
FIG. 3 is a plan view in elevation of a first side of a spacer, which may be employed with the tool of FIG. 1.
Figure 4:
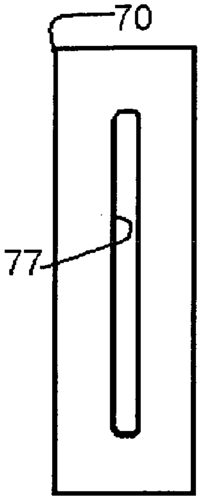
FIG. 4 is a view in elevation of a jamb-and-frame-facing or tool-facing side of the spacer of FIG. 3.
Figure 5:
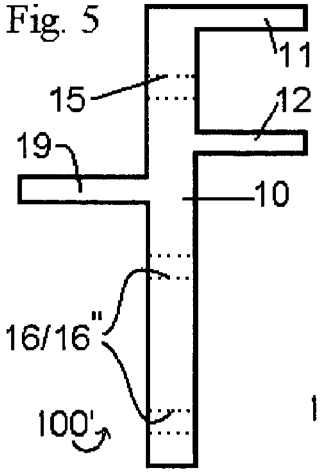
FIG. 5 is a plan view in elevation of a first side of another embodiment of a tool useful for installing a pre-hung door, which includes a projection that may face away from the jamb and frame.
Figure 6:
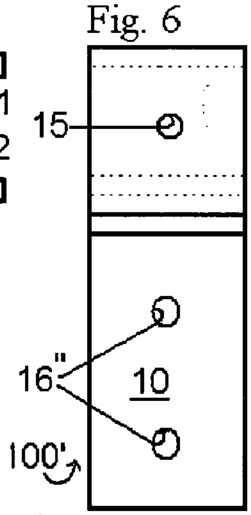
FIG. 6 is a plan view in elevation of a jamb-and-frame-facing side of the tool of FIG. 5.
Figure 7:
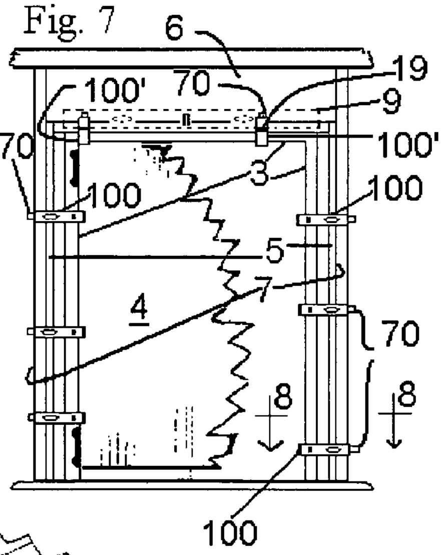
FIG. 7 is a view in elevation of a plurality of tools useful for installing a pre-hung door such as of FIGS. 1 and 5, along with a plurality of spacers such as of FIG. 3, in use in installing a pre-hung door in a building structure.
Figure 8:
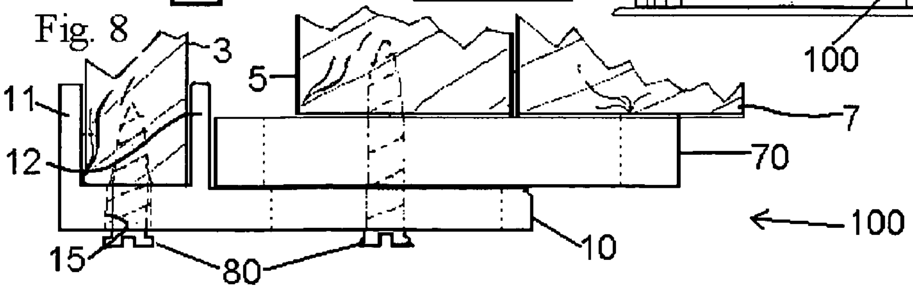
FIG. 8 is a plan view in partial section of tool, spacer and door jamb and building structure door frame components found within FIG. 7, taken along 8-8.
Figure 9:
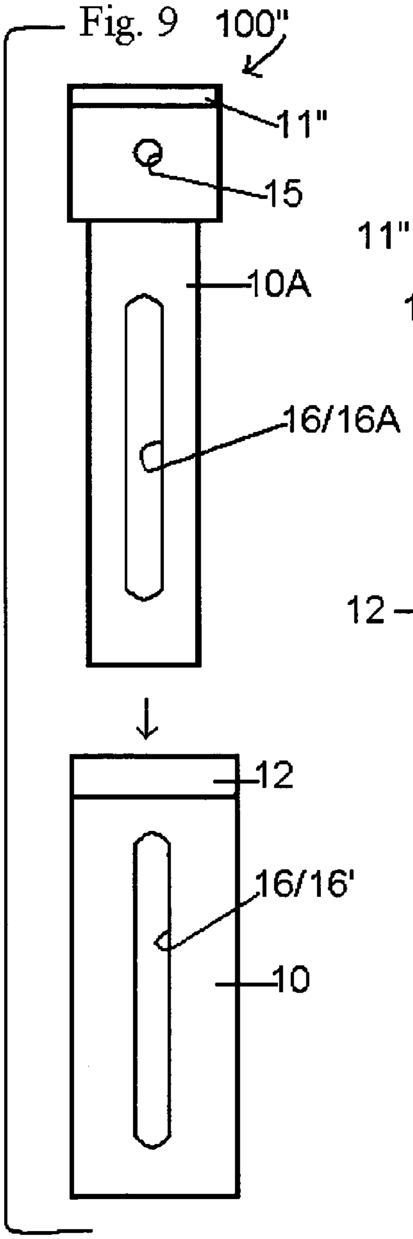
FIG. 9 is an exploded view of an adjustable tool useful for installing a pre-hung door, viewing onto its jamb-and-frame-facing side.
Figure 10:
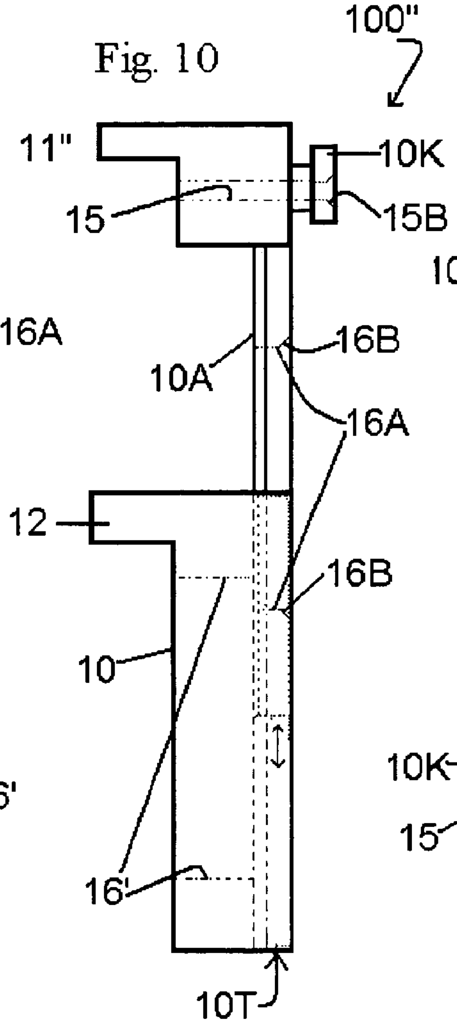
FIG. 10 is a plan view in elevation of the tool of FIG. 9, being slid together.
Figure 11:
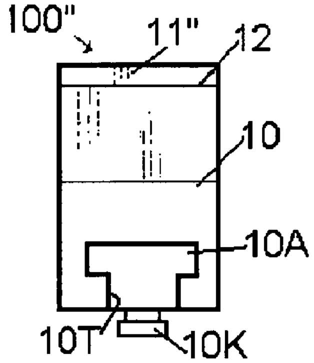
FIG. 11 is another side view in elevation of the tool of FIG. 9, showing how its parts cooperate.
Figure 12:
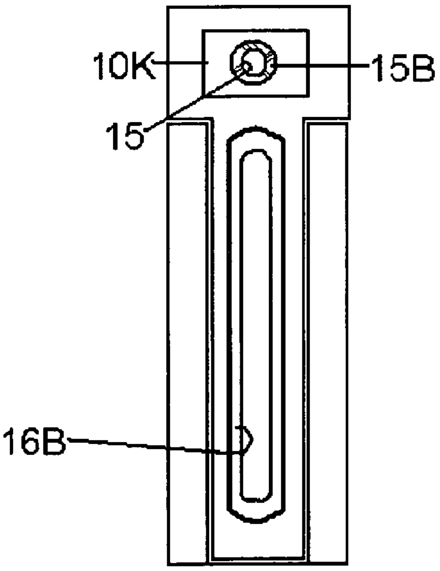
FIG. 12 is a view in elevation of the tool of FIG. 9, viewing onto its face that may face away from the jamb and frame.
Figure 13:
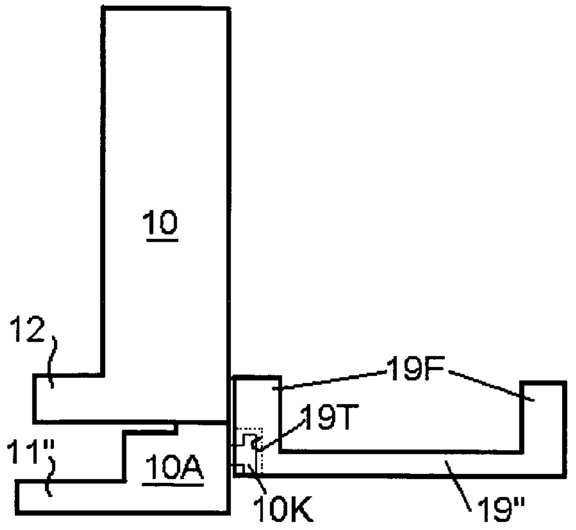
FIG. 13 is a plan view in elevation of the tool of FIG. 9, to which is attached a level-holding bracket.
Figure 14:
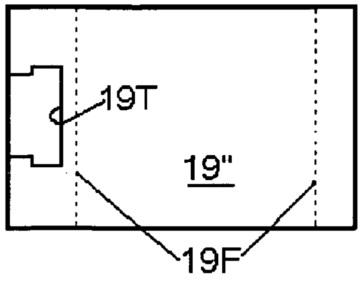
FIG. 14 is a bottom plan view of the bracket in FIG. 13.
Figure 15:
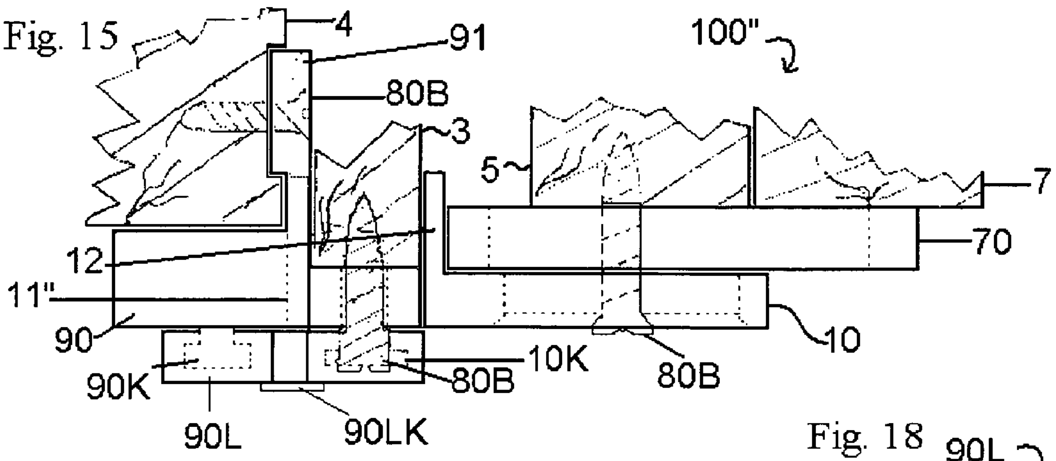
FIG. 15 is a top plan view in partial section of tool, spacer and door jamb and building structure door frame components found in FIG. 9 along with a door striker spacer and locking plate.
Figure 16:
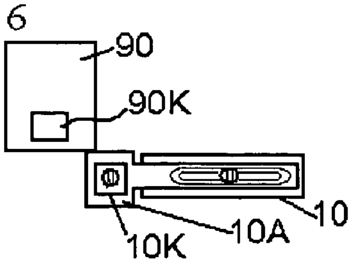
FIG. 16 is a view in elevation of the tool and door striker pacer found within FIG. 15, with the locking plate removed for clarity, showing a respective position in use.
Figure 17:
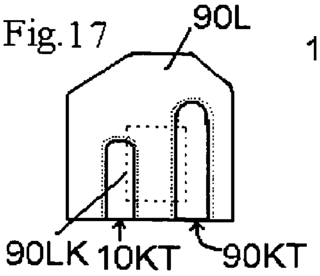
FIG. 17 is a plan view in elevation of the locking plate found within FIG. 15.
Figure 18:
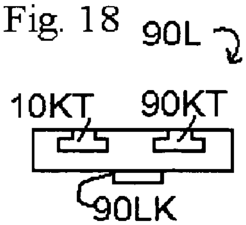
FIG. 18 is a bottom view of the locking plate of FIG. 17.

The invention can be further understood by the detail set out below, which may be read in view of the drawings. The same is to be taken in an illustrative and not necessarily limiting sense.

The tool useful for installing a pre-hung door embraces a body and at least one jamb-securing finger. The pre-hung door may be an external door or an internal door. The body can be removably attached to a building component about a door opening such as a 2×4, with the finger(s) for holding a jamb component of the pre-hung door, for instance, with fasteners such as screws, nails, wire, certain releasable adhesives, and so forth. Spacer(s) may be employed in conjunction with the tool, especially to simulate the space that would otherwise be taken up by wall board such as, for example, gypsum board, which may be hung after the pre-hung door has been installed.

The tool, fastener and spacer may be made of any suitable material(s). Metal, plastic, ceramic and/or wood may be used.

A kit may be provided to include one tool and a fastener and/or a spacer. As well, a kit may be provided to include more than one tool with or without fasteners and/or spacers. The kit may be provided in conjunction with packaging.

Use of the tool to install a pre-hung door embraces supplying at least one tool and a pre-hung door; engaging a jamb component of the pre-hung door with the tool, typically through its finger(s); engaging a door frame component of a building structure into which the pre-hung door is to be installed, typically by employing the body of the tool; and shimming, shoring and/or securing the pre-hung door through its jamb. Fastener(s) and/or spacer(s) may be employed. The tool and any fastener(s) and/or spacer(s) may be removed after installation of the door.

With reference to the drawings, tool 100, 100', 100" can be employed with door jamb 3 that includes swinging door 4, intended for installation into a door frame of a building structure, which may have first, cripple stud 5, header 6, and second stud 7. Leveling device 9 such as a bubble level may be employed.

The tool 100, 100', for example, made of aluminum, includes body 10, door jamb receiving first finger 11 and door jamb receiving second finger 12. The first finger 11 keeps distance between the door jamb 3 and door 4 even, for example, ⅛ of an inch for a ⅛-inch thick first finger 11. The second finger 12 can be optional, but its presence can assist in securement, especially for the do-it-yourselfer. Distance 13 between the insides of the first and second fingers 12, 13 is sufficient to embrace the thickness of the door jamb 3, say, being about ¾ of an inch. First orifice 15, which can allow a fastener to pass through to attach to the door jamb 3, may be of any suitable configuration such as a slot or a round or polygonal hole, for example, a round hole. Second orifice 16, which can allow a fastener to pass through to attach to a door frame component of the building structure such as a 2×4 stud, a 2×8 header, and so forth, may be of any suitable configuration such as slot 16' or round or polygonal hole(s), for example, a pair of round holes 16". The tool 100' includes bracket ledge 19 on the side of the body 10 opposite the first and second fingers 11, 12, for example, to place the level 9 on during installation.

The spacer, for example, of nylon or polypropylene, includes body 70, and has width 73 for simulating the thickness of yet to be hung gypsum board (drywall), say, being ½ of an inch. Orifice 77, which can allow a fastener to pass through to attach to the cripple stud 5, header 6 or full stud 7, may be of any suitable configuration such as a slot or a round or polygonal hole, for example, a slot.

The fastener may be screw 80.

The tool 100" is intrinsically adjustable. For instance, the body 10 can have inserted adjustable body part 10A, which may have knob 10K that may accommodate further accessories, and which can slide in along T-slot 10T. Adjustable clamp finger 11" may be provided to engage various sized door jamb components with the adjustment, for instance, in opposition to the stationary second finger 12. The first orifice 15 can have bevel 15B to accommodate a bevel-headed wood screw 80B. The second orifice 16, which may be in a form of slot 16A, may also have bevel 16B to accommodate another bevel-headed wood screw 80B. In use, as with the tool 100, 100', a spacer 70 may be employed with the tool 100".

Accessories may be provided. For example, level-holding bracket 19" may have fingers 19F and T-slot 19T, which may slide over the knob 10K. Door striker spacer 90, which may include knob 90K, has plate spacer finger 91 to go between the jamb 3 and door 4 at the countersunk position of a striker plate. The door striker spacer 90 can be affixed in relation to the tool 100" by employment of locking plate 90L, which can include locking plate knob 90LK for grasping with the fingers and thumb, first T-slot 10KT for engaging the knob 10K of the tool 100", and second T-slot 90KT for engaging the knob 90K of the door striker spacer 90.

Various additional accessories can be similarly provided.

The present invention is thus provided. Various feature(s), part(s), step(s), subcombination(s) and/or combination(s) may be employed with or without reference to other feature (s), part(s), step(s), subcombination(s) and/or combination(s) in the practice of the invention, and numerous adaptations and modifications can be effected within its spirit, the literal claim scope of which is particularly pointed out by the following claims:

I claim:

1. A tool useful for installing a pre-hung door having a jamb, which comprises a body having a length having first and second ends and running along a first direction and a width shorter than and running along a second direction perpendicular to the length, said length and width, in general, defining a plane, and at least two spaced apart jamb-securing fingers attached to and projecting from the body substantially direction substantially perpendicular to the plane defined by the length and width of the body and substantially running along said second direction, with at least one of the two jamb-securing fingers positioned substantially between the first and second ends of the length of the body, wherein the body includes means for holding a jamb component of the pre-hung door and a door frame component of a building, and can be removably attached to a building component about a door opening, with said at least two fingers useful for holding the jamb component of the pre-hung door and keeping an even distance between the jamb and door when a plurality of said tools is used to install the door.

2. The tool of claim 1, wherein the body is substantially flat, and said means includes at least one orifice for passing at least one fastener through the body.

3. The tool of claim 2, wherein the at least one orifice includes at least two orifices, at least one of which passes through a portion of the body between the at least two spaced apart fingers, and at least another one of which passes through another portion of the body outside the at least two spaced apart fingers.

4. The tool of claim 3, which further comprises a bracket ledge on and projecting from the body on a side opposite the at least two spaced apart fingers, on which can be placed a level when installing the door.

5. The tool of claim 1, which is intrinsically adjustable.

6. The tool of claim 5, wherein the body has a stationary portion that has a slot opening that can have inserted therein an adjustable body part, which can slide in and out along the slot opening, and which has, as a first of said at least two jamb-securing fingers, an adjustable clamp finger included therewith in opposition to, as a second of said at least one jamb-securing fingers, a stationary second finger projecting from the body so that various sized door jamb components can be engaged with adjustment of the adjustable body part inserted in the slot opening.

7. The tool of claim 6, wherein the body includes at least one orifice, and the adjustable body part includes another at least one orifice, both orifices for passing at least one fastener therethrough and securing the adjustable body part to the stationary portion of the body.

8. The tool of claim 6, wherein the slot opening in the stationary portion of the body is in a form of a T-slot.

9. The tool of claim 7, wherein the slot opening in the stationary portion of the body is in a form of a T-slot.

10. The tool of claim 6, wherein the adjustable body part has a knob that can accommodate at least one further accessory.

11. The tool of claim 10, wherein the at least one further accessory embraces a level-holding bracket having fingers and a T-slot, which can slide over the knob.

12. The tool of claim 10, wherein the at least one further accessory embraces a door striker spacer, which includes a door striker spacer knob, a plate spacer finger to go between the jamb and door at a countersunk position of a striker plate; and a locking plate for affixing the door striker spacer in relation to the tool, which includes a locking plate knob for grasping with the fingers and thumb, a first locking plate T-slot for engaging the knob of the tool, and second locking plate T-slot for engaging the door striker spacer knob.

13. A kit comprising the following:

at least one tool useful for installing a pre-hung door having a jamb, which embraces a body having a length having first and second ends and running along a first direction and a width shorter than and running along a second direction perpendicular to the length, said length and width in general, defining a plane, and at least two spaced apart, jamb-securing fingers attached to and projecting from the body substantially in a third direction substantially perpendicular to the plane defined the length and width of the body and substantially running along said second direction, with at least one of the two jamb-securing fingers positioned substantially between the first and second ends of the length of the body, wherein the body includes means for holding a jamb component of the pre-hung door and a door frame component of a building, and can be removably attached to a building component about a door opening, with said at least two fingers useful for holding the jamb component of the pre-hung door and keeping an even distance between the jamb and door when a plurality of said is used to install the door; and at least one of the group consisting of at least one fastener and at least one spacer.

14. The kit of claim 13, wherein the at least one fastener embraces at least one screw.

15. The kit of claim 13, wherein the at least one spacer embraces a spacer including a spacer body, which has a width for simulating a thickness of yet to be hung gypsum board; and a spacer orifice through the spacer body, which can allow a fastener to pass through to attach to a stud or header.

16. The kit of claim 13, wherein both the at least one fastener and the at least one spacer are provided.

17. The kit of claim 16, which has a plurality of said tool, of the at least one fastener, and of the at least one spacer.

18. The kit of claim 13, wherein the body of the tool is substantially flat; said means includes at least two orifices for passing at least two fasteners through the body, at least one of the at least two orifices passing through a portion of the body between the at least two spaced apart fingers, and at least another of the at least two orifices passing through another portion of the body outside the at least two spaced apart fingers.

19. The kit of claim 13, wherein said tool is intrinsically adjustable, and its body has a stationary portion that has a slot opening that can have inserted therein an adjustable body part, which can slide in and out along the slot opening, and which has, as a first of the at least two jamb-securing fingers, an adjustable clamp finger included therewith in opposition to, as a second of the at least two jamb-securing fingers, a stationary second finger projecting from the body so that various sized door jamb components can be engaged with adjustment of the adjustable body part inserted in the slot opening; and wherein said means includes at least one orifice, and the adjustable body part includes another at least one orifice, both orifices for passing at least one fastener therethrough and securing the adjustable body part to the stationary portion of the body.

20. A method of installing a pre-hung door, which comprises the following steps, all not necessarily conducted in series:

supplying a pre-hung door, and at least one tool embracing a body having a length having first and second ends and running along a first direction and a width shorter than and naming along a second direction perpendicular to the length, said length and width, in general, defining a plane, and at least two spaced apart jamb-securing fingers attached to and projecting from the body substantially in a third direction substantially perpendicular to the plane defined by the length and width of the body and substantially running along a said second direction, with at least one of the two jamb-securing fingers positioned substantially between the first and second ends of the length of the body, wherein the body includes means for holding a jamb component of the pre-hung door and a door frame component of a building, and can be removably attached to a building component about a door opening, with said at least two fingers useful for holding the jamb component of the pre-hung door and keeping an even distance between the jamb and door when a plurality of said tools is used to install the door;

engaging a jamb component of the pre-hung door with the tool, with its at least two fingers, and engaging a door frame component of a building structure into which the pre-hung door is to be installed, with the body of the tool; and shimming, shoring and/or securing the pre-hung door through its jamb.

* * * * *